(12) United States Patent
Dai et al.

(10) Patent No.: US 9,354,432 B2
(45) Date of Patent: May 31, 2016

(54) LENS WITH DISCONTINUOUS SUB-LIGHT EMERGING FACES

(71) Applicant: HON HAI PRECISION INDUSTRY CO., LTD., New Taipei (TW)

(72) Inventors: Feng-Yuen Dai, New Taipei (TW); Chau-Jin Hu, New Taipei (TW); Li-Ying Wang He, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 196 days.

(21) Appl. No.: 14/085,692

(22) Filed: Nov. 20, 2013

(65) Prior Publication Data

US 2015/0117031 A1    Apr. 30, 2015

(30) Foreign Application Priority Data

Oct. 28, 2013    (TW) .................................. 102138835

(51) Int. Cl.
*F21V 5/04*    (2006.01)
*G02B 19/00*    (2006.01)
*F21Y 101/02*    (2006.01)

(52) U.S. Cl.
CPC ........ *G02B 19/0061* (2013.01); *G02B 19/0009* (2013.01); *F21V 5/04* (2013.01); *F21Y 2101/02* (2013.01)

(58) Field of Classification Search
CPC ..... F21V 5/045; F21V 5/048; G02B 19/0061; G02B 19/0009; F21Y 2101/02
See application file for complete search history.

(56) References Cited

U.S. PATENT DOCUMENTS

| 8,109,658 | B2* | 2/2012 | Matsuki | H01L 33/58 362/244 |
| 9,039,236 | B2* | 5/2015 | Tseng | F21V 5/04 362/268 |
| 9,115,866 | B2* | 8/2015 | Hu | F21V 5/04 |
| 2015/0078008 | A1* | 3/2015 | Wang He | F21V 5/045 362/311.06 |
| 2015/0078009 | A1* | 3/2015 | Hu | F21V 5/046 362/311.09 |
| 2015/0117029 | A1* | 4/2015 | Dai | G02B 3/00 362/311.06 |

\* cited by examiner

*Primary Examiner* — David N Spector
(74) *Attorney, Agent, or Firm* — Novak Druce Connolly Bove + Quigg LLP

(57) ABSTRACT

A lens includes a bottom face, a light incident face defined in the bottom face, a light emerging face opposite to the bottom face and a lateral face connecting the light emerging face with the bottom face. An optical axis extends through centers of the light incident face and the light emerging face. The light emerging face includes a plurality of sub-light emerging faces discontinuous from each other. Each sub-light emerging face has a concave face adjacent to the optical axis, and a convex face away from the optical axis.

19 Claims, 6 Drawing Sheets

LENS WITH DISCONTINUOUS SUB-LIGHT EMERGING FACES

BACKGROUND

1. Technical Field

The disclosure generally relates to lenses, and more particularly, to a lens having discontinuous sub-light emerging faces.

2. Description of Related Art

Nowadays LEDs (light emitting diodes) are applied widely in various applications for illumination. The LED is a highly pointed light source. In order to illuminate several areas simultaneously, the typical LED lamp needs a larger amount of LEDs orientated different directions. Furthermore, brackets are also required for the LED lamp in order to support the LEDs towards different directions. Thus, a cost of the LED lamp is high.

What is needed, therefore, is a lens with discontinuous sub-light emerging faces which can address the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the various views.

DETAILED DESCRIPTION

Figure 1:
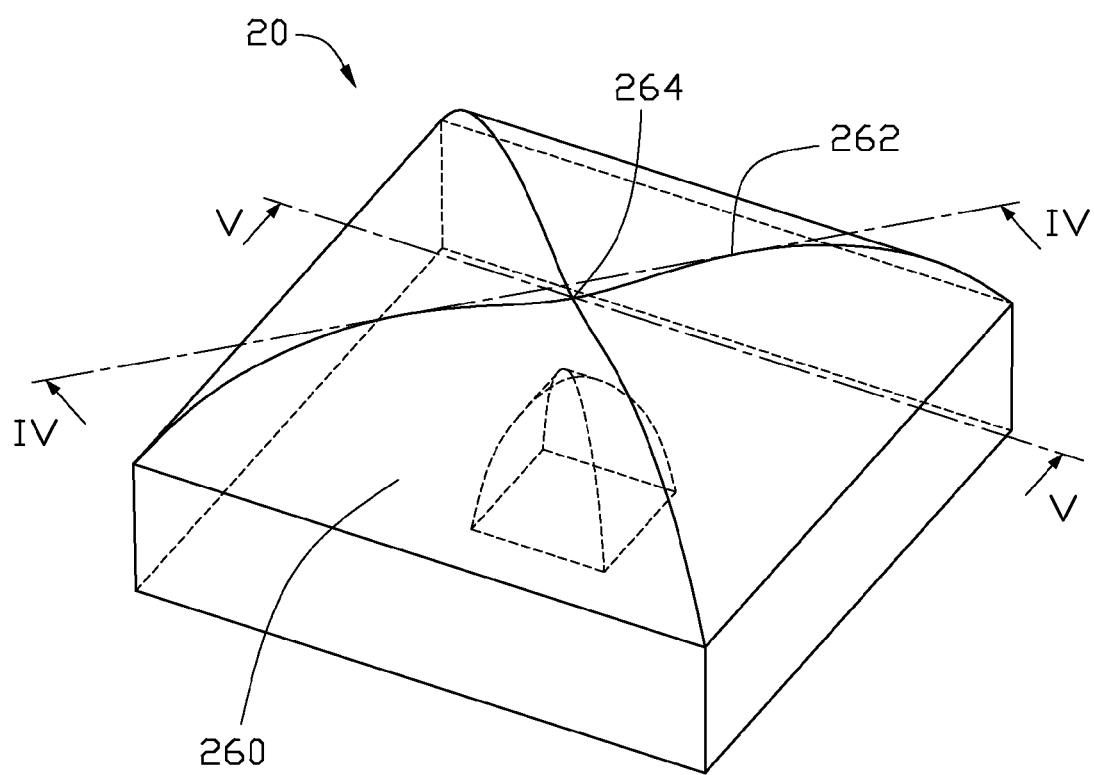
FIG. 1 is an isometric view of an LED unit in accordance with an embodiment of the present disclosure.
Figure 5:
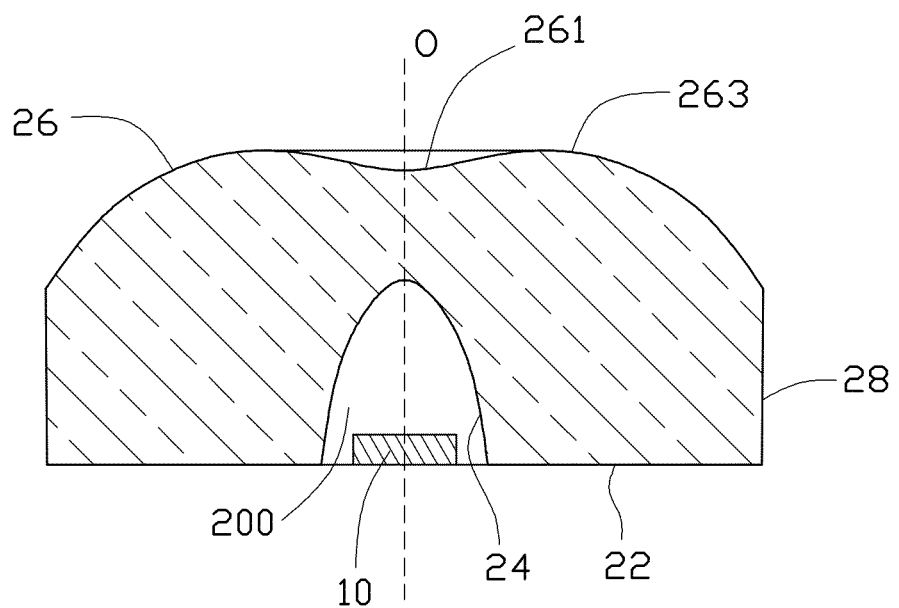
FIG. 5 is a cross section of the LED unit of FIG. 1, taken along line V-V thereof.

Referring to FIGS. 1 and 5, an LED (light emitting diode) unit in accordance with an embodiment of the present disclosure is shown. The LED unit includes an LED 10 and a lens 20 covering the LED 10.

The lens 20 may be made of transparent material such as epoxy, silicone, glass or the like. The lens 20 includes a bottom face 22, a light incident face 24 formed in the bottom face 22, a light emerging face 26 opposite to the bottom face 22 and a lateral face 28 connecting the bottom face 22 and the light emerging face 26. The lens 20 has an optical axis O extending through a center of the light incident face 24 and the light emerging face 26.

Figure 2:
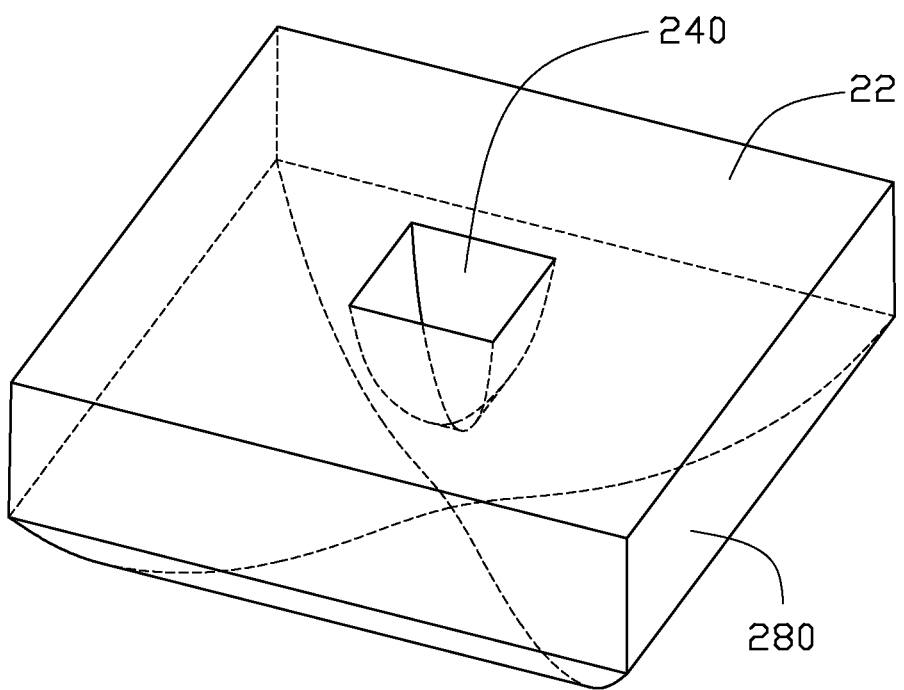
FIG. 2 is an inverted view of a lens of the LED unit of FIG. 1.
Figure 3:
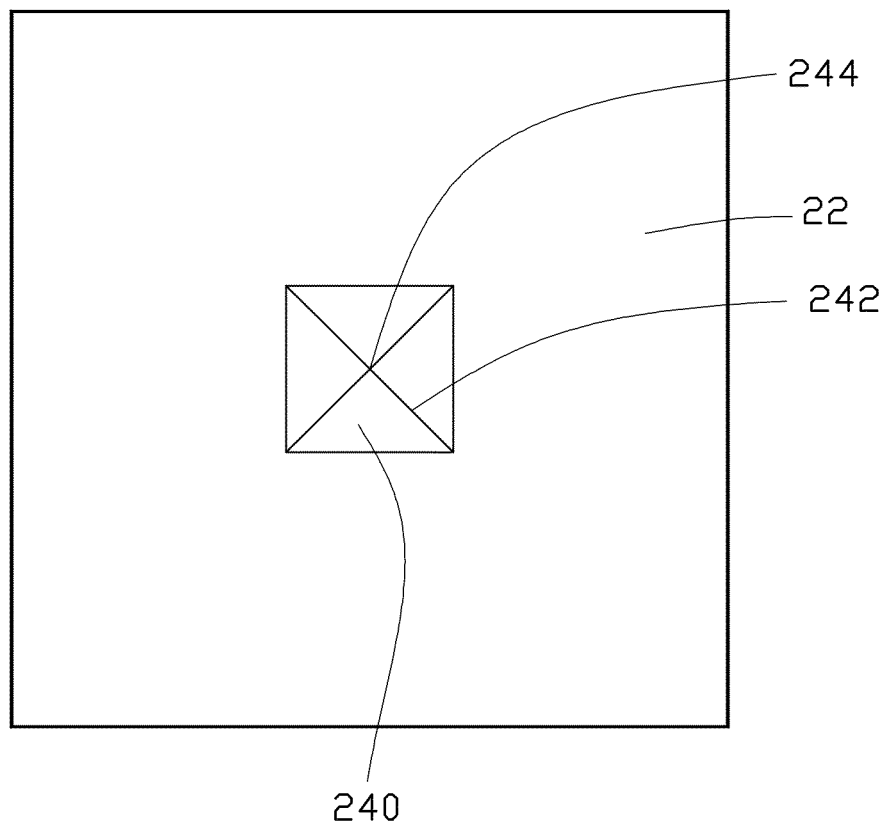
FIG. 3 is a bottom view of the lens of the LED unit of FIG. 1.
Figure 4:
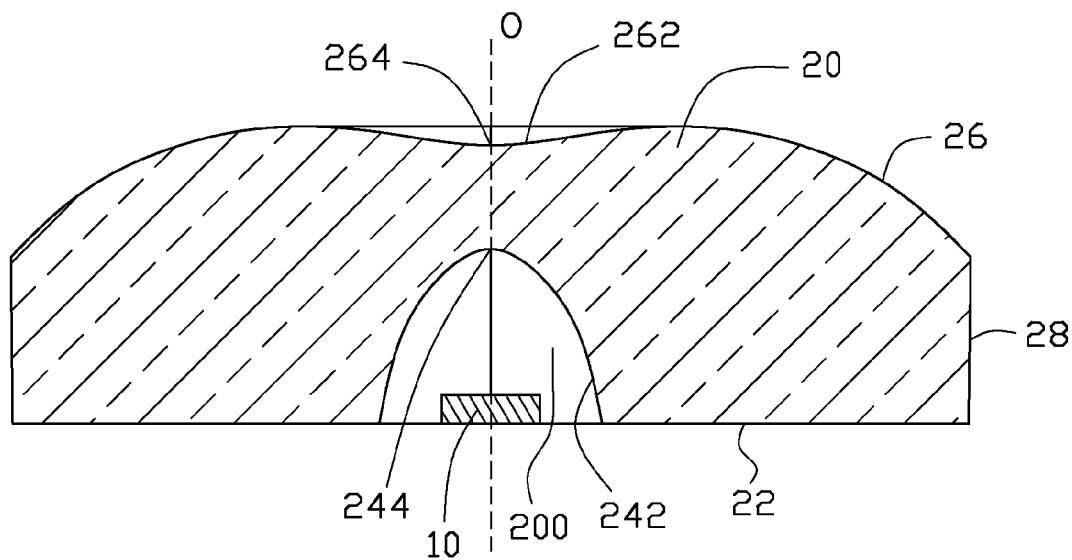
FIG. 4 is a cross section of the LED unit of FIG. 1, taken along line IV-IV thereof.

Also referring to FIGS. 2-4, the bottom face 22 is a flat and square face. The light incident face 24 is depressed from a central area of the bottom face 22. A cavity 200 is enclosed by the light incident face 24. The LED 10 is received in the cavity 200 to emit light towards the lens 20. The light incident face 24 includes four sub-light incident faces 240 abruptly connecting with each other. Each sub-light incident face 240 is a curved and concaved concave face extending upwardly and inwardly. A width of each sub-light incident face 240 gradually decreases from the bottom face 22 towards the light emerging face 26. The four sub-light incident faces 240 are discontinuous from each other and a significant and visible boundary 242 is formed between every two adjacent sub-light incident faces 240. In other words, a curvature of each sub-light incident face 240 is discontinuous from that of an adjacent sub-light incident face 240 at the boundary 242 therebetween. Each boundary 242 is a curved line. Every two opposite boundaries 242 are coplanar with each other. Thus, every two opposite boundaries 242 are continuous with each other. The four boundaries 242 are all joined at a point 244 which is a top of the light incident face 24. The optical axis O of the lens 20 extends through the point 244. The curvature of each sub-light incident face 240 gradually increases from two adjacent boundaries 242 towards a center thereof. The light emitted from the LED 10 is divided by the four sub-light incident faces 240 to four individual light beams when passing through the light incident face 24.

Figure 6:
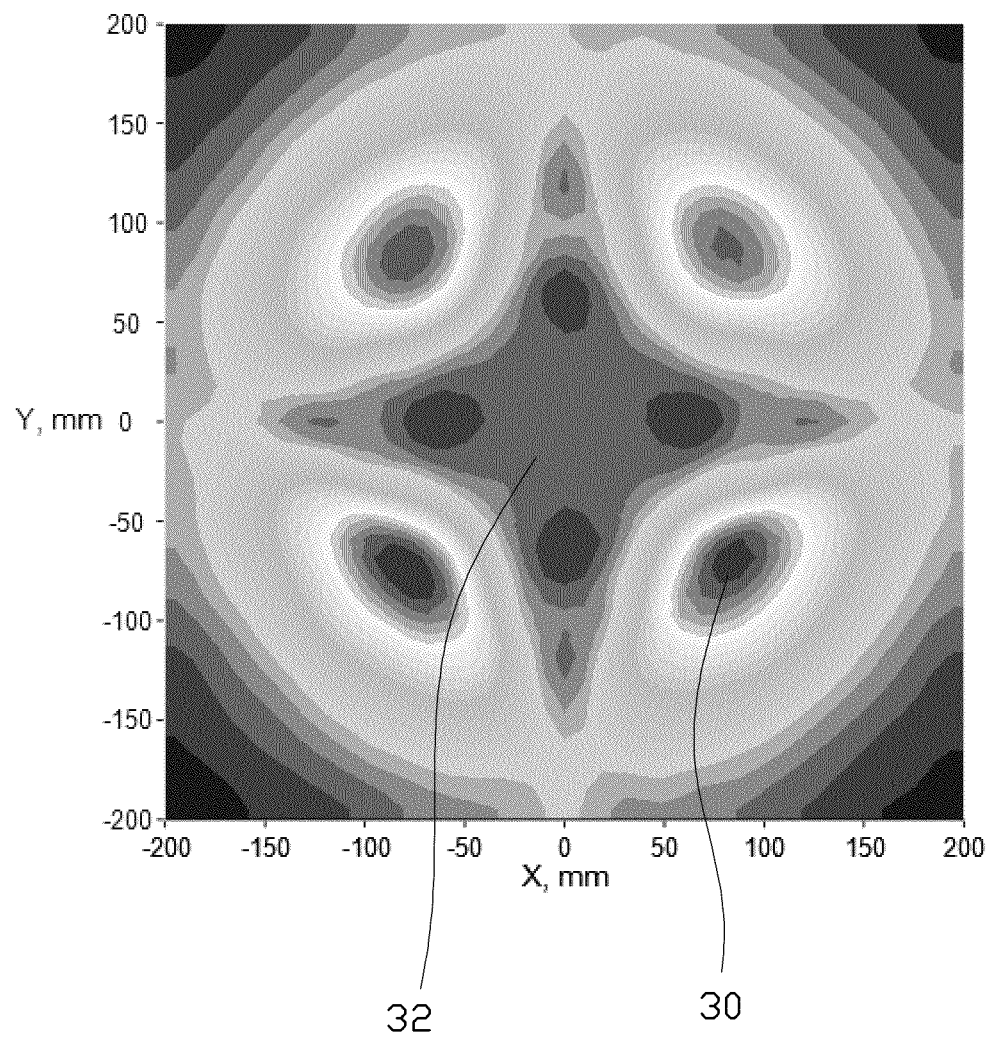
FIG. 6 shows a light distribution of the LED unit of FIG. 1.

Also referring to FIG. 6, the light emerging face 26 is located above the light incident face 24. The light emerging face 26 includes four sub-light emerging faces 260 abruptly connecting with each other. Each sub-light emerging face 260 is located corresponding to the sub-light incident face 240 just below each sub-light emerging face 260. The four sub-light emerging faces 260 are discontinuous from each other and a significant and visible boundary 262 is formed between every two adjacent sub-light emerging faces 260. In other words, a curvature of each sub-light emerging face 260 is discontinuous from that of an adjacent sub-light emerging face 260 at the boundary 262 therebetween. Each boundary 262 is a curved line. Two opposite boundaries 262 are coplanar with each other so that the two opposite boundaries 262 are continuous with each other. The four boundaries 262 are all joined at a point 264 aligned with the point 244 of the light incident face 24. Each sub-light emerging face 260 is a smooth curved face. Each sub-light emerging face 260 has a concave face 261 adjacent to the point 264, and a convex face 263 away from the point 264. The concave face 261 protrudes toward the light incident face 24 and the convex face 263 protrudes away from the light incident face 24. The convex face 263 has an area larger than that of the concave face 261. A curvature of each sub-light emerging face 260 gradually increases from two adjacent boundaries 262 towards a center thereof. A width of each sub-light emerging face 260 gradually decreasing from the lateral face 28 towards the point 264. The concave face 261 of each sub-light emerging face 260 diverges a part of a corresponding beam adjacent to the optical axis O, and the convex face 263 of each sub-light emerging face 260 converges another part of the corresponding beam away from the optical axis O. Thus, the four beams 30 are further collimated by the four sub-light emerging faces 260 to be more independent from each other. Four beams 30 output from the lens 20 form a dark area 32 therebetween. The dark area 32 has a star shape so that the four beams 30 are clearly separated from each other by the dark area 32. Therefore, the four beams 30 produced from the LED unit can illuminate four areas simultaneously. The lens 20 has a low cost, whereby the whole cost of the LED unit is reduced.

The lateral face 28 includes four sub-lateral faces 280 connecting with each other. Each sub-lateral face 280 interconnects one sub-light emerging face 260 and the bottom face 22. Each sub-lateral face 280 is parallel to an opposite sub-lateral face 280, and perpendicular to an adjacent sub-lateral face 280. The four lateral faces 280 are all perpendicular to the bottom face 22.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A lens comprising:
  a light incident face;
  a bottom face; and
  a light emerging face opposite to the light incident face, an optical axis extending through the light emerging face;
  wherein the bottom face is a flat and square face and the light incident face is defined in a central area of the bottom face; and
  wherein the light emerging face comprises four discontinuous sub-light emerging faces, each sub-light emerging face comprising a concave face adjacent to the optical axis and a convex face away from the optical axis.

2. The lens of claim 1, wherein a width of each sub-light emerging face gradually decreases in a direction towards the optical axis.

3. The lens of claim 1, wherein the lens further comprises a plurality of sub-lateral faces each interconnecting a corresponding sub-light emerging face and the bottom face.

4. The lens of claim 3, wherein two opposite sub-lateral faces are parallel to each other, and two adjacent sub-lateral faces are perpendicular to each other.

5. The lens of claim 1, wherein the lens further a lateral face, the lateral face connects the bottom face and the light emerging face.

6. The lens of the claim 5, wherein the lateral face comprises four sub-lateral faces connecting with each other, each sub-lateral face interconnects one sub-light emerging face and the bottom face.

7. The lens of claim 6, wherein the four lateral faces are all perpendicular to the bottom face, and each sub-lateral face is parallel to an opposite sub-lateral face, and perpendicular to an adjacent sub-lateral face.

8. The lens of claim 1, wherein a first boundary is formed between every two adjacent sub-light emerging faces.

9. The lens of claim 8, wherein two opposite first boundaries are coplanar with each other.

10. The lens of claim 8, wherein the first boundaries are joined at a first point and the optical axis extending through the first point.

11. The lens of claim 8, wherein a curvature of each sub-light emerging face gradually increases from two adjacent first boundaries towards a center thereof.

12. The lens of claim 8, wherein a curvature of each sub-light emerging face is discontinuous from that of an adjacent sub-light emerging face at the first boundary therebetween.

13. The lens of claim 1, wherein the light incident face comprises four discontinuous sub-light incident faces each corresponding to one sub-light emerging face.

14. The lens of claim 13, wherein each sub-light incident face is a concave face depressing towards a corresponding sub-light emerging face.

15. The lens of claim 13, wherein a width of each sub-light incident face gradually decreases in a direction towards the optical axis.

16. The lens of claim 13, wherein a second boundary is formed between every two adjacent sub-light incident faces.

17. The lens of claim 16, wherein two opposite second boundaries are coplanar with each other.

18. The lens of claim 16, wherein the second boundaries are all joined at a second point, the optical axis extending through the second point.

19. The lens of claim 16, wherein each sub-light incident face has a curvature discontinuous from that of an adjacent sub-light incident face at the second boundary therebetween.

* * * * *